United States Patent [19]

Schwenk

[11] Patent Number: 4,531,671
[45] Date of Patent: Jul. 30, 1985

[54] HEATING AND VENTILATING SYSTEM FOR THE OCCUPANT COMPARTMENT OF A MOTOR VEHICLE

[75] Inventor: Wolfgang Schwenk, Hünfelden, Fed. Rep. of Germany

[73] Assignee: General Motors Corporation, Detroit, Mich.

[21] Appl. No.: 627,181

[22] Filed: Jul. 2, 1984

[30] Foreign Application Priority Data

Jun. 28, 1983 [DE] Fed. Rep. of Germany ....... 3323176

[51] Int. Cl.$^3$ ............................................. B60H 1/02
[52] U.S. Cl. .................................. 237/12.3 B; 98/2.06
[58] Field of Search ...................... 237/12.3 A, 12.3 B, 237/2 A; 98/2.06, 2.05; 236/13

[56] References Cited

U.S. PATENT DOCUMENTS 4,355,753 10/1982 Watanabe ...................... 237/12.3 A Primary Examiner—Henry Bennett
Attorney, Agent, or Firm—R. L. Phillips

[57] ABSTRACT

A heating and ventilation apparatus for motor vehicles has a fan, a hot air channel passing over a heat exchanger, a cold air bypass, a mixing chamber, controllable valves, and ventilation or air outlet jets, wherein air streams with different temperatures are conducted in channels adjacent to each other and an opening closable by a valve flap is provided between the adjacent channels. The valve flap is controllable in dependence on the flow rate prevailing in a first channel, in such a way that the valve flap is opened to an increasing extent with increasing flow rate, so that as the flow rate increases in the first channel, air can overflow from a second channel into the first channel to an increasing extent. This allows an automatic increase in temperature of the ventilation air on setting the heating, and avoids flow of cold air back into the mixing chamber.

8 Claims, 6 Drawing Figures

HEATING AND VENTILATING SYSTEM FOR THE OCCUPANT COMPARTMENT OF A MOTOR VEHICLE

TECHNICAL FIELD

The invention relates to a heating and ventilating system for the occupant commpartment of a motor vehicle, including a blower fan which is supplied with ambient air, a hot air duct extending over a heat exchanger, a cold air bypass, a mixing chamber, controllable valves or doors as well as ventilating and air discharge nozzles diosposed in the dashboard and leg room area, wherein air currents of varying temperatures are traversing inside adjaccent ducts, and wherein for the purpose of blending the air currents, an air passage opening is provided between the adjacent air ducts which is adapted to be closed by a flap valve.

BACKGROUND OF THE INVENTION

Heating and ventilating systems of this type are being used in motor vehicles, particularly passenger cars, to prevent fogging and icing of vehicle windshields and windows. They also serve to supply the vehicle occupant compartment with fresh air of the desired temperature. The desired temperature does not only depend on the season of the year, but is also very much related to the particular comfort requirements of the individual. However, as a general rule, it is desirable that the air supplied into the leg room be of a higher temperature than the air supplied to the upper region of the vehicle compartment, i.e. the dashboard area.

The aforementioned comfort considerations in regard to heating and ventilating the vehicle occupant compartment require that the admitted air be regulated in a variety of ways in terms of air flow rate and temperature.

The use of controllable valves or doors for raising the temperature of the cold air drawn in by the blower fan is known in the art. According to the state of the art, such valves or doors are usually controlled by mechanical, electrical or pneumatic means. However, controls of this type usually require the use of complex motion transmitting devices, such as Bowden wires, rods, linkages, servomotors, vacuum units or the like.

SUMMARY OF THE INVENTION

It is the object of the present invention to provide a heating and ventilating system of the type described in the foregoing in which complex motion transmitting elements can be dispensed with so as to render the assembly relatively simple and economical in construction.

In pursuance of this object, the invention provides that the flap valve is controllable in response to the flow rate prevailing in a first duct so as to cause progressive opening of the flap valve as the flow rate increases, so that air from a second duct is permitted to enter a first duct at a rate that is a function of the flow rate prevailing in the first duct.

The invention thus eliminates the need of employing motion transmitting devices of the type mentioned in the foregoing, inasmuch as the temperaturee regulation in the first duct, which is by way of blending air currents of varying temperatures, is effected only by means of flow control.

The flow-controlled temperature regulating means according to the invention is capable of effecting a temperature rise (which would be the rule) as well as a temperature drop.

Another important advantage of the invention arises from the fact that no negative effects are experienced with respect to control forces acting on the control elements provided for the heating and ventilating system. A further advantageous feature is that, after installation of the dashboard and the heating and ventilating control elements into the vehicle, adjustment operations that were required in the past with prior-art heating and ventilating systems, are not necessary any more.

The arrangement according to the invention is characterized primarily by its low cost. Another advantage of the arrangement is that it is usable as a retrofit, i.e. it can be added, without any great effort and expenditure, to existing heating and ventilating systems.

Accordingly, the basic concept of the invention is to have a flap valve between a first and second duct which is adapted to be controlled in response to air flow conditions prevailing in the first duct. On the basis of the generaly concept of the invention it is conceivable that the flap valve be controlled by the pressure head prevailing in the first duct. However, in order to utilize the design concept to best advantage, it is proposed that the flap valve be controlled, instead, by the vacuum prevailing in the first duct. This arrangement will provide that flow obstructions are being obviated that might occur if a pressure head in the first duct is used as the control means.

In accordance with another advantageous feature of the invention, it is proposed that the flap valve be in the form of a check valve which is adapted to move automatically into closed position in response to a rise in pressure or drop in vacuum occurring in to first duct.

In accordance with a preferred embodiment of the invention, there are provided in the first duct air current guide means for generating a vacuum in the region above the flap valve. These air current guide means function to cause a restriction in the first duct such that an increase in air flow rate will be effected in the narrowest cross-sectional area of the first duct. This increase in flow rate will cause, on the basis of Bernoulli's law, a corresponding increase in vacuum at that place, and thus an increase in the force acting on the flap valve in the direction of opening.

While the concept of this invention is also applicable, as indicated in the foregoing, for reducing the temperature in the respective duct (called in this instance the "first duct"), the preferred arrangement is to utilize the concept for raising the temperature. It is therefore proposed to have an arrangement in which the flap valve cooperates with a valve seat of a warm air duct and is controllable by the cold or fresh air flowing through a first duct, so that, as the flow rate of the cold air increases, an increased volume of warm air in the second duct is added to and blended with said cold air.

In view of the well known fact that fresh air discharged from the center air vent disposed at the level of the vehicle dashboard is usually perceived as being too cold by the vehicle occupants, the concept of the invention may include an arrangement in which the first duct, i.e. the cold or fresh air transporting duct, is extending to a so-called center air vent mounted on or above the dashboard, and in which the adjacent second duct is transporting heated fresh air coming from a mixing chamber, which is conducted to the discharge nozzles mounted in the leg room area and in the lateral zones of the dashboard.

DESCRIPTION OF THE PREFERRED EMBODIMENT

The invention will be described by way of example with reference to the following description and the accompanying drawings wherein.

Figure 1:
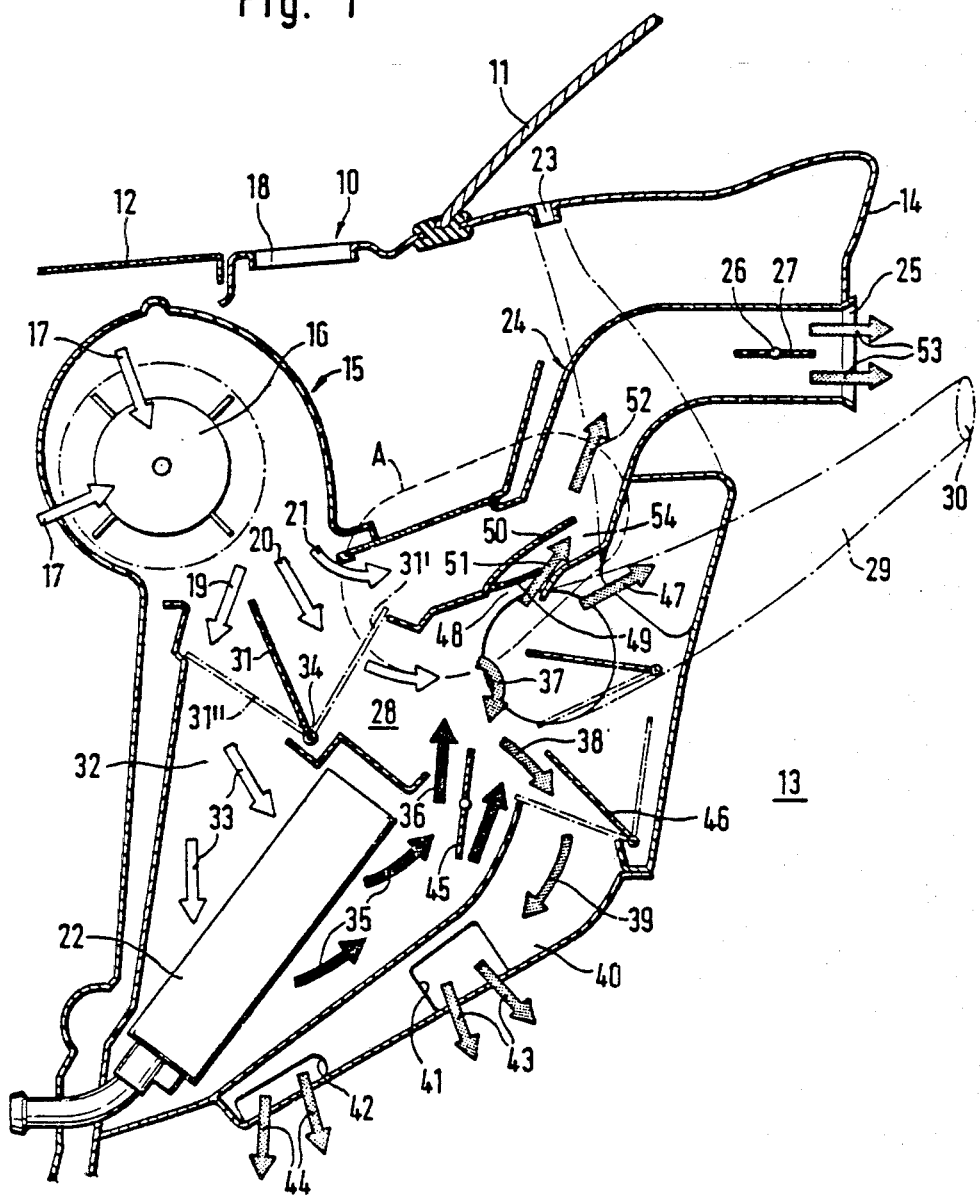
FIG. 1 is a schematic vertical cross-sectional view of a heating and ventilating system for a passenger car constructed according to the invention.

Referring to FIG. 1, numeral 10 denotes the area of a passenger car body ahead of the windshield. The windshield itself is denoted by the numeral 11. A portion of the engine hood disposed immediately ahead of the body panel 10 is designated by the numeral 12. Numeral 13 denotes the interior compartment of the car, and numeral 14 the dashboard.

The heating and ventilating system, which is schematically illustrated in FIG. 1, includes a blower 15 with a fan 16. The blower fan assembly 15, 16 draws cold air from the outside (arrows 17) which enters through vents 18 into the blower zone below the body panel 10. The partial air currents exiting from the blower fan 15, 16 are designated by the numerals 19, 20, 21. Mounted in the lower portion of the heating and ventilating system is a heat exchanger 22 which is heated in the usual manner by the engine, as for instance, by the engine cooling water flowing therethrough.

The air currents produced by the illustrated heating and ventilating system are being discharged through various air vents and air discharge nozzles into the occupant compartment 13. Numeral 23 denotes a defroster nozzle which functions to prevent fogging and icing of the windsheild. In the area of the dashboard 14 a first duct 24 terminates into a so-called center air vent 25. Therefore, the first duct 24 is also termed the "center air vent hose". Inside the first duct 24 and immediately ahead of the center air vent 25 there is disposed a vent door 27 (shown in its open position in FIG. 1) which is pivotable about a joint 26.

Immediately adjacent the first duct 24, there is provided a second duct 28 from which lateral conduits 29 (illustrated in dash-dotted lines) are extending. Said conduits 29 terminate in air discharge vents 30 located on either side of the dashboard 14. Additional ducts, (indicated in dash-dotted lines) are extending upwardly from duct 28 to defroster nozzles 23 provided on the dashboard 14. The cold air currents issuing from the blower fan 15, 16 are traversing, as indicated, the following path. The partial current 19 enters, after passing temperature blend door 31, into a chamber 32 arranged above the heat exchanger 22 (see arrows 33). For this to occur, the temperature blend door 31, which is pivotable about a joint 34, must be in the intermediate position indicated by the solid line, or in the closed position denoted by the numeral 31'. The other closed position of the temperature blend door 31 is indicated by the dash-dotted line and denoted by the numeral 31". This latter closing position will prevent cold air from entering into the chamber 32 above the heat exchanger 22.

The other two cold air currents 20 and 21 are directed into the first duct 24. However, with the temperature blend door in the open position, the current 20 will be directed into the second conduit 28 where it will mix with air (arrows 35, 36) that has been heated by the heat exchanger 22. The third cold air current 21 will remain in the first duct 24 and will flow towards the center air vent 25.

A portion of the blended air currents formed in the second duct 28 (see arrows 37, 38 and 39) is entering into a third duct 40 and from there discharges through air discharge vents 41, 42 into the leg room 13 of the occupant compartment 13 (see arrows 43, 44. The blended air currents discharging into the leg room is controllable by a pivotable door 46.

Another portion of the blended air currents (see arrow 47) formed in the second duct 28 enters into the ducts 29 and is directed to the lateral air discharge vents 30 arranged on either side of the dashboard 14, and to the defroster nozzles 23 by way of additional conduits.

Figure 2:
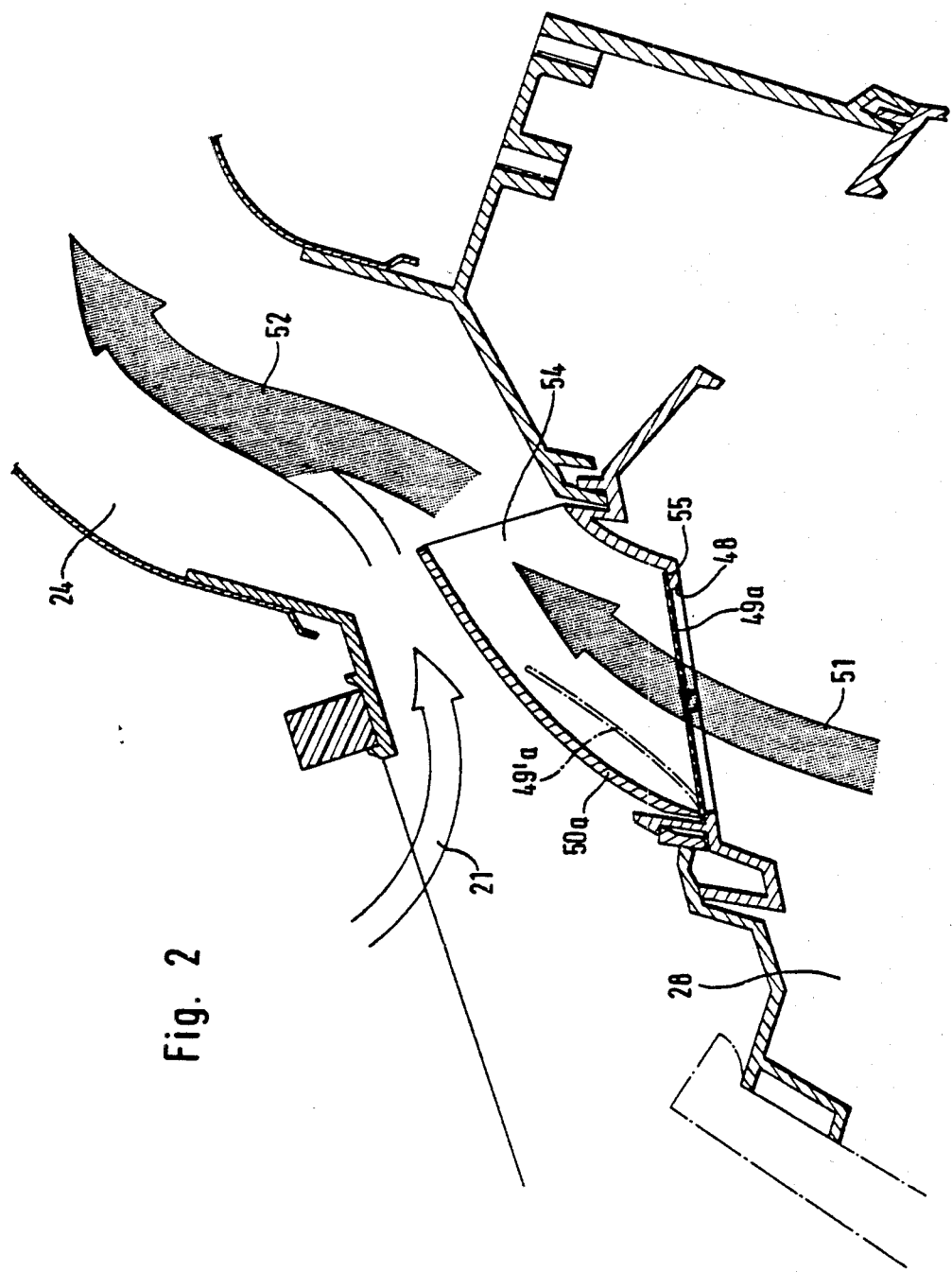
FIG. 2 is the area A of FIG. 1, at an enlarged scale, of a modification of the heating and ventilating system according to the invention.

As apparent from FIG. 1 (see also FIGS. 2 and 3 and information below), the first duct 24 and the second duct 28 are communicating through an air passage opening at 48 which is adapted to be closed by a flap valve 49. Immediately above the opening 48, air flow guide means 50 are provided which extend into the first duct 24 and which, in the embodiments according to FIGS. 1 and 2 are in the form of a web. The air flow guide means 50 are arranged and fashioned in such a manner that a reduction in cross-sectional area is effected in that first duct in the direction of arrow 21 which will cause an acceleration of the air flow in the first duct 24. These conditions hold true for the latter segment of the adjustment range of the vent door 27, i.e. the segment between a specific initial opening position and a fully open position. As a result of the accelerated air flow inside the first duct 24, a vacuum is created below the air guide means 50, i.e. below the air passage opening 48, which will cause the flap valve 49 to be lifted so as to connect the second duct 28 with the first duct 24. This will provide that heated secondary air (see arrow 51) is permitted to pass from the second duct 28 into the first duct 24 and is blended with the cold air current 21. As a result of the prevailing conditions described in the foregoing, the opening 48 is progressively being uncovered as the flap valve 49 is caused to be raised further due to the increased flow rate of the cold air current 21 in the first duct 24, so that with increased flow rate of the cold air in the first duct 24, more heated air 51 is permitted to pass from the second duct 28 into the first duct 24 and thus to the center air vent 25 (see arrows 52 and 53). This will provide that, depending on the speed of the blower fan 15, 16 and the position of the vent door 27 in the latter segment of the adjustment range, the volume of heated secondary air (arrows 51) added to the cold air (arrow 21), pumped into the first conduit 24 by the blower fan 15, 16, is controlled in such a manner that the air discharged through the center air vent 25 will not be perceived by the occupant as being too cold. The rise in temperature of the air forwarded to the center air vent 25 through the first duct 24 depends, of course, on the temperature of the secondary air (arrow 51). The temperature of the blended air current in turn, can be regulated by varying the position of the air temperature blend door 31. When the flow rate of the cold air current 21 in the first duct is relative low, i.e., at low fan speeds and/or with the vent door 27 being in the closed position, the vacuum in the vacuum chamber 54 beneath the air guide member (web 50) will be very low, or there will be no vacuum at all. As a consequence, the flap valve 49, which is made, preferably, of an elastic material such as rubber, and which is in the form of a check valve, will automatically close the air passage opening 48 between the second duct 28 and the first duct 24, so that in this instance, no cold air is admitted into the second duct 28 and, vice versa, no heated air can enter into the first duct 24.

One embodiment of an air guide means 50, which is illustrated only schematically in FIG. 1, will become apparent from the more detailed illustration in FIG. 2 wherein, for the sake of clarity and better understanding, like parts are indicated by corresponding reference characters. Referring to FIG. 2, the air guide means denoted by the numeral 50a are in the form of a web which is extending over the entire width of the, preferably, rectangular cross-sectional area of the first duct 24. A valve seat 55 is provided at the air passage opening 48 between the second duct 28 and the first duct 24 which cooperates with the elastic flap valve, which is denoted here by reference numeral 49a. The valve closed position is illustrated here by the solid line, whereas the valve open position is indicated by the dash-dotted line and denoted by the reference numeral 49a. It is also apparent from FIG. 2 that the flap valve is clamped between the web 50a at the left hand side and the valve seat 55.

The cross-sections being formed in the first duct 24 on both sides, i.e., above and below the air guide means (web 50a), may lie between a ratio range of 40 to 60 to 60 to 40. The particular cross-sectional ratio to be chosen depends on the desired temperature of the air to be discharged from the center air vent 25 (see FIG. 1).

Figure 3:
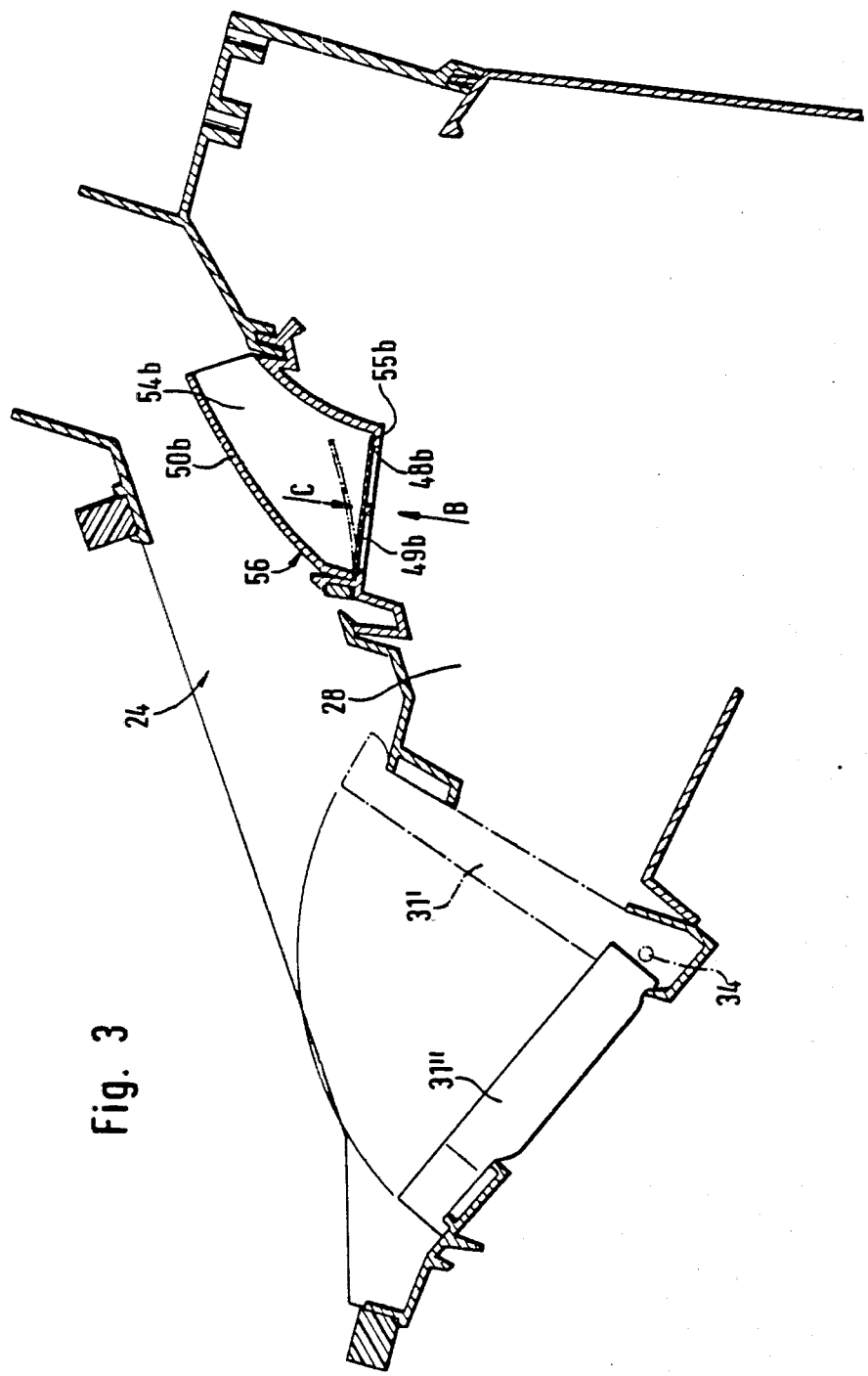
FIG. 3 is a modified form of the heating and ventilating system illustrated in FIG. 2, the view corresponding to that of FIG. 2.

The embodiment illustrated in FIG. 3 differs from the one in FIG. 2 in that the air guide means is in the form of a nozzle member denoted by the numeral 56. The nozzle-shaped member, which is adapted to be snapped as a unit into the air passage zone between the second duct 28 and the first duct 24, does not only include the air guide means 50b, but also the air passage opening 48b with valve seat 55b, flap valve 49b and vacuum chamber 54b.

Figure 4:
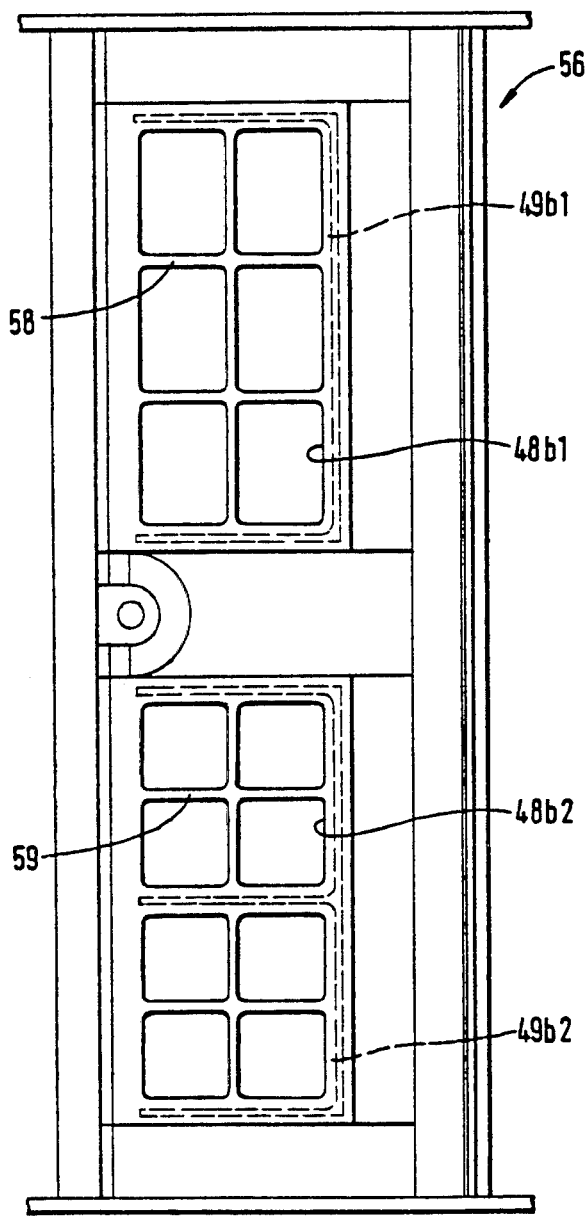
FIG. 4 is a fragmentary view of the object illustrated in FIG. 3 as viewed in the direction of arrow B.
Figure 5:
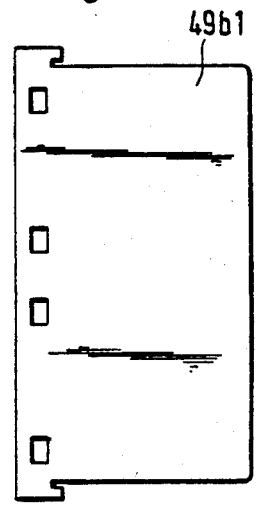
FIGS. 5 and 6 are fragmentary views of the object illustrated in FIG. 3 as viewed in the direction of arrow C.
Figure 6:
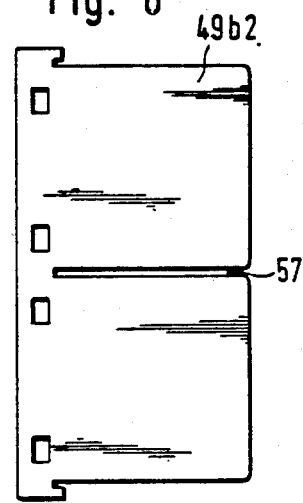

FIG. 4 is a plan view (as viewed from below in the direction of arrow B) of the nozzle-shaped member 56. In examining this view it will be apparent that the passage opening 48b between the second duct 28 and the first duct 24 is divided into two partial pasage openings, which are denoted by the numerals 48b1 and 48b2, respectively. Accordingly, there are two flap valves provided (see FIGS. 5 and 6) which are denoted, respectively, by the reference numerals 49b1 and 49b2. Said flap valves may be of identical or different configuration. The flap valve 49b2 illustrated in FIG. 6 differs from that in FIG. 5 in that it is provided with a center slot 57.

It is also apparent from FIG. 4 that the passage openings 48b1 and 48b2 are of lattice-like configuration which will provide better seating of the flap valve 49b1 and 49b2. The lattice-like configuration of the air transfer openings 48b1 or 48b2 is denoted in FIG. 4 by the numerals 58 and 59, respectively.

SUMMARY

A heating and ventilating system for the occupant compartment of motor vehicles includes a blower supplied with ambient air, a hot air duct extending past a heat exchanger, a cold air bypass, a mixing chamber, controllable valves or doors, as well as air vents or air discharge nozzles disposed in the dashboard area and the leg room, wherein air currents of different temperatures are traversing in ducts mounted adjacent to one another, and wherein, for the purpose of blending the air currents, an air passage opening is provided between the adjacent conduits which is adapted to be closed by a flap valve. The flap valve is controllable in response to the flow rate prevailing in a first duct in a manner to cause progressive opening of the flap valve as the flow rate increases, so that with increasing flow rate in the first duct, a progressively increasing volume of air is permitted to pass from a second duct over into a first duct.

A heating and ventilating system of this type permits the temperature of the ventilating air to be automatically raised at a preselected heater setting and prevents cold air from returning into the mixing chamber. The arrangement of automatic air current control in response to air flow rate obviates the necessity of providing previously required mechanical, electrical or pneumatic motion transmitting elements. Furthermore, there is no need any more for adjustment operations to be performed subsequent to the installation of the dashboard and the heating and ventilating system, and the arrangement is therefore adaptable for retrofit installation. The heating and ventilating system incorporating the afore-described features can be provided at a very low cost.

The above described embodiments are illustrative of the invention which may be modified within the scope of the appended claims.

The embodiments of the invention in which an exclusive property or privilege is claimed are defined as follows:

1. Heating and ventilating system for the occupant compartment of motor vehicles, including a blower supplied with ambient air, a hot air duct extending past a heat exchanger, a cold air bypass, a mixing chamber, controllable valves and doors and air vents or air discharge nozzles disposed in the area of a dashboard and leg room for the occupants, wherein air currents of different temperatures are traversing in ducts mounted adjacent to one another, and wherein, for the purpose of mixing the air currents with one another, an opening is provided between the adjacent ducts which is adapted to be closed by a flap valve, the improvement comprising:

flap valve means responsive to the air flow rate prevailing in a first duct in a manner to cause progressive opening of the flap valve means as the flow rate increases, so that with increasing air flow rate in the first duct, a progressively increasing volume of air is permitted to pass from a second duct over into the first duct, and the first duct being provided, for the purpose of creating a vacuum in the area above the flap valve means with air guide means which causes a restriction of the cross-sectional area of the first duct so that an increase in the air flow rate occurs in the narrowest cross-sectional area of the first duct.

2. Heating and ventilating system according to claim 1, the improvement comprising:
the first duct including a web projecting into the air path so that a vacuum chamber is formed between the web and the flap valve means.

3. Heating and ventilating system according to claim 2, the improvement comprising:
the first duct having a rectangular cross-section and the web extending over the entire width of the rectangular section first duct.

4. Heating and ventilating system according to claim 2, the improvement comprising:
the air guide means being in the form of a nozzle-shaped member having one end terminating in the first duct and another end facing the second duct provided with an air passage opening and a valve seat for the flap valve means.

5. Heating and ventilating system according to claim 4, the improvement comprising:
the nozzle-shaped member being tapered so as to be of a progressively smaller cross-sectional area in the direction of air flow.

6. Heating and ventilating system according to claim 1, the improvement comprising:
the flap valve means being made of an elastic material, such as rubber.

7. Heating and ventilating system according to claim 1, the improvement comprising:
the flap valve means cooperating with a valve seat of the second duct in which heated air is conducted, and being adapted to be controlled by cold or fresh air flowing inside the first duct in such a manner that as the flow rate of cold air increases, heated air is progressively added from the second duct to the cold air.

8. Heating and ventilating system according to claim 1, the improvement comprising:
the first duct, which is provided for conducting cold or fresh air, extending to a center air vent disposed on or below the dashboard, and
the adjacent second duct being provided for conducting heated secondary air supplied by the mixing chamber and for directing said heated secondary air to air vents disposed laterally of the dashboard so as to be discharged into the leg room, and to defroster nozzles disposed on the dashboard.

* * * * *